(12) United States Patent
Matsutani (10) Patent No.: US 7,969,467 B2
(45) Date of Patent: Jun. 28, 2011

(54) PRINTING SYSTEM, PRINTING DEVICE, IMAGING DEVICE, PRINTING METHOD AND IMAGE-TRANSMITTING METHOD

(75) Inventor: Atsushi Matsutani, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 1283 days.

(21) Appl. No.: 11/168,438

(22) Filed: Jun. 29, 2005

(65) Prior Publication Data

US 2006/0002751 A1    Jan. 5, 2006

(30) Foreign Application Priority Data

Jul. 1, 2004   (JP) ................................. 2004-195657

(51) Int. Cl.
*H04N 5/225*   (2006.01)
(52) U.S. Cl. .................................................. 348/207.2
(58) Field of Classification Search ............... 348/207.2, 348/231.2; 358/425, 426.03, 426.06
See application file for complete search history.

(56) References Cited

U.S. PATENT DOCUMENTS

| | | | |
|---|---|---|---|
| 5,706,097 A * | 1/1998 | Schelling et al. ............ 358/296 |
| 6,300,976 B1 * | 10/2001 | Fukuoka ................... 348/231.99 |
| 6,806,978 B1 * | 10/2004 | Tamura et al. ............... 358/1.15 |
| 6,882,361 B1 * | 4/2005 | Gaylord ..................... 348/207.1 |
| 6,904,539 B2 * | 6/2005 | Ueno ........................... 713/500 |
| 6,930,709 B1 * | 8/2005 | Creamer et al. ........... 348/211.3 |
| 6,937,275 B2 * | 8/2005 | Heiles ........................ 348/231.2 |
| 7,038,714 B1 * | 5/2006 | Parulski et al. ............ 348/207.2 |
| 7,170,627 B2 * | 1/2007 | Tanaka et al. ............... 358/1.15 |
| 7,268,903 B2 * | 9/2007 | Kojima et al. .............. 358/1.15 |
| 7,305,490 B2 * | 12/2007 | Metz et al. .................... 709/247 |
| 7,411,607 B2 * | 8/2008 | Kikugawa ................. 348/207.2 |
| 7,466,357 B2 * | 12/2008 | Myojo ...................... 348/333.05 |
| 7,479,984 B2 * | 1/2009 | Tanaka et al. ............. 348/207.2 |
| 2003/0151668 A1 * | 8/2003 | Hatakenaka et al. ...... 348/207.2 |
| 2004/0114199 A1 * | 6/2004 | Kanno .......................... 358/474 |
| 2005/0052676 A1 * | 3/2005 | Masumoto et al. .......... 358/1.13 |
| 2005/0068425 A1 | 3/2005 | Matsutani |
| 2005/0122539 A1 * | 6/2005 | Sugimoto ................... 358/1.15 |
| 2005/0146608 A1 * | 7/2005 | Yosida et al. .............. 348/207.1 |
| 2005/0179939 A1 * | 8/2005 | Kunihiro .................... 358/1.15 |
| 2006/0197976 A1 * | 9/2006 | Oka ............................ 358/1.15 |

FOREIGN PATENT DOCUMENTS

| | | |
|---|---|---|
| JP | 9-139876 | 5/1997 |
| JP | 10-108006 | 4/1998 |
| JP | 2001-45452 | 2/2001 |
| JP | 2001-45494 | 2/2001 |
| JP | 2001-69386 | 3/2001 |
| JP | 2002-94711 | 3/2002 |
| JP | 2004-112360 | 4/2004 |
| JP | 2005-72989 | 3/2005 |

OTHER PUBLICATIONS

Machine Translation of Japanese Office Action dated Sep. 7, 2010; 3 pages.*
Office Action mailed Sep. 7, 2010 in corresponding Japanese Application No. JP 2004-195657.

* cited by examiner

*Primary Examiner* — Jason Chan
*Assistant Examiner* — Gary C Vieaux
(74) *Attorney, Agent, or Firm* — Oblon, Spivak, McClelland, Maier & Neustadt, L.L.P.

(57) ABSTRACT

A printing system of the present invention connects an imaging device and a printing device logically, decides an amount of data of an image suitable for communication according to a speed of the communication; and changes the amount of data of the image to be transmitted and received according to the decision.

7 Claims, 8 Drawing Sheets

FIG. 5 dev1          dev2

FIG. 6 dev3          dev4

FIG. 7

```
[HDR]
GEN REV =01.10
GEN CRT ="Caplio"-3.00
[JOB]
PRT PID =001
PRT TYP =IDX
PRT QTY =001
IMG FMT =EXIF2-J
IMG SRC ="../DCIM/100RICOH/RIMG0001.JPG"
IMG SRC ="../DCIM/100RICOH/RIMG0002.JPG"
IMG SRC ="../DCIM/100RICOH/RIMG0003.JPG"
IMG SRC ="../DCIM/100RICOH/RIMG0004.JPG"
IMG SRC ="../DCIM/100RICOH/RIMG0005.JPG"
IMG SRC ="../DCIM/100RICOH/RIMG0006.JPG"
IMG SRC ="../DCIM/100RICOH/RIMG0007.JPG"
IMG SRC ="../DCIM/100RICOH/RIMG0008.JPG"
IMG SRC ="../DCIM/100RICOH/RIMG0009.JPG"
IMG SRC ="../DCIM/100RICOH/RIMG0010.JPG"
IMG SRC ="../DCIM/100RICOH/RIMG0011.JPG"
IMG SRC ="../DCIM/100RICOH/RIMG0012.JPG"
```

PRINTING SYSTEM, PRINTING DEVICE, IMAGING DEVICE, PRINTING METHOD AND IMAGE-TRANSMITTING METHOD

BACKGROUND OF THE INVENTION

1. Field of the Invention

The present invention relates to a printing system, an imaging device and a printing method for carrying out printing by logically connecting a printing device with the imaging device, and more particularly to a printing system, a printing device, an imaging device, a printing method and an image-transmitting method wherein time required for transmitting image data is reduced.

2. Description of the Related Art

As a method for logically connecting an imaging device such as a digital camera and a printing device such as a printer, standards like Bluetooth and PictBridge are known (for reference, see JP-A H9-139876).

The applicant of the present application has also proposed a data-output system and a digital still video camera in JP-A H9-139876 for the above-mentioned connecting method. The proposed technology is characterized by changing an image according to output performance of the printing device.

In addition, an image file having a hierarchy structure as typified by JPEG2000 is being appeared in these years. According to the JPEG2000 format, a plurality of hierarchies from a hierarchy of rough image to a hierarchy of detailed image is contained in a single file. This file format has a characteristic that it is possible to utilize only up to an intermediate hierarchy to obtain a medium-rough image without utilizing all of data.

In the aforementioned conventional technologies, however, time required for communication and so on has not been taken into account. Since a plurality of image data is transmitted when carrying out printing of an index type or a multi-image type, there is a drawback that time corresponding to the number of images is required when transmitting the image data. Alternatively, even when a thumbnail is transmitted in substitution for an original image, a printed image thereof will be dismal depending upon a size of printing.

SUMMARY OF THE INVENTION

Therefore, the present invention has been made in view of the above circumstances, and at least one objective of the present invention is to provide a printing system, a printing device, an imaging device, a printing method and an image-transmitting method having time-reducing means configured to shorten the time necessary to obtain image data required for printing.

To achieve these and other advantages and in accordance with the purpose of the invention, as embodied and broadly described herein, the invention provides a printing system. The printing system comprises an imaging device; a printing device; a connecting device which logically connects the imaging device and the printing device; a deciding section configured to decide an amount of data of an image suitable for communication according to a speed of the communication; and a data-amount changing section configured to change the amount of data of the image to be transmitted and received according to the decision of the deciding section.

The present invention also provides a printing device. The printing device comprises a connecting device which logically connects the printing device and an imaging device; a deciding section configured to decide an amount of data of an image suitable for communication according to a speed of the communication; and an acquiring section configured to acquire the image having the amount of data which corresponds with the amount of data decided by the deciding section from the imaging device.

The present invention further provides an imaging device. The imaging device comprises a connecting device which logically connects the imaging device and a printing device; a deciding section configured to decide an amount of data of an image suitable for communication according to a speed of the communication; and a transmitting section configured to transmit the image having the amount of data which corresponds with the amount of data decided by the deciding section.

Also, the present invention provides another printing system. The printing system comprises an imaging device; a printing device; a connecting device which logically connects the imaging device and the printing device; a deciding section configured to decide an amount of data of an image suitable for communication by using at least one of information on the number of images printed per printing and information on an expected size of a printed image; and a data-amount changing section configured to change the amount of data of the image to be transmitted and received according to the decision of the deciding section.

The present invention provides another printing device. The printing device comprises a connecting device which logically connects the printing device and an imaging device; a deciding section configured to decide an amount of data of an image suitable for communication by using at least one of information on the number of images printed per printing and information on an expected size of a printed image; and an acquiring section configured to acquire the image having the amount of data which corresponds with the amount of data decided by the deciding section from the imaging device.

The present invention provides another imaging device. The imaging device comprises a connecting device which logically connects the imaging device and a printing device; a deciding section configured to decide an amount of data of an image suitable for communication by using at least one of information on the number of images printed per printing and information on an expected size of a printed image; and a transmitting section configured to transmit the image having the amount of data which corresponds with the amount of data decided by the deciding section.

In addition, the present invention provides a printing system. The printing system comprises an imaging device; a printing device; a connecting device which logically connects an imaging device and a printing device; and a transmitting and receiving section configured to transmit and receive a part of an original image of an image file targeted to be printed.

The present invention provides a printing device. The printing device comprises a connecting device which logically connects the printing device and an imaging device; and a printing device configured to print an image by receiving a part of an original image of an image file targeted to be printed.

The present invention provides an imaging device. The imaging device comprises a connecting device which logically connects the imaging device and a printing device; and a transmitting section configured to transmit a part of an original image of an image file targeted to be printed.

According to an embodiment of the present invention, the printing system further comprises a transmitting and receiving section configured to transmit and receive the original image by dividing the original image at a neighborhood of a diverging point of a hierarchy structure of the original image.

According to an embodiment of the present invention, in the printing device, a diverging point of a hierarchy structure of the original image is utilized for printing.

According to an embodiment of the present invention, the imaging device further comprises a reading section configured to read a diverging point of a hierarchy structure of the original image, and a transmitting section configured to transmit the original image by dividing the original image by utilizing information on the read diverging point.

The present invention provides yet another printing device. The printing device comprises a connecting device which logically connects the printing device and an imaging device; and a notifying section configured to notify the imaging device of a recommended data amount of a file to be transmitted or a recommended range of a data amount of the file to be transmitted.

The present invention provides yet another imaging device. The imaging device comprises a connecting device which logically connects the imaging device and a printing device; and a receiving section configured to receive a recommended data amount of a file to be transmitted or a recommended range of a data amount of the file to be transmitted from the printing device.

According to an embodiment of the present invention, the imaging device further comprises a transmitting section configured to transmit an image which fits within the recommended data amount or the recommended range of the data amount.

According to an embodiment of the present invention, the printing device further comprises a deciding section configured to decide the recommended data amount or the recommended range of the data amount by utilizing at least one of an expected size of a printed image and performance of the printing device.

Also, the present invention provides a printing method for making a printing system perform printing. The printing system comprises an imaging device, a printing device, and a connecting device which logically connects the imaging device and the printing device. The method decides an amount of data of an image suitable for communication according to a speed of the communication; and changes the amount of data of the image to be transmitted and received according to the decision.

In addition, the present invention provides a printing method of a printing device. The printing device comprises a connecting device which logically connects the printing device and an imaging device. The method decides an amount of data of an image suitable for communication according to a speed of the communication; and acquires the image having the amount of data which corresponds with the decided amount of data from the imaging device.

Furthermore, the present invention provides an image-transmitting method of an imaging device. The imaging device comprises a connecting device which logically connects the imaging device and a printing device. The method decides an amount of data of an image suitable for communication according to a speed of the communication; and transmits the image having the amount of data which corresponds with the decided amount of data.

The present invention provides another printing method for making a printing system perform printing. The printing system comprises an imaging device, a printing device, a connecting device which logically connects the imaging device and the printing device. The method decides an amount of data of an image suitable for communication by using at least one of information on the number of images printed per printing and information on an expected size of a printed image; and changes the amount of data of the image to be transmitted and received according to the decision.

The present invention provides another printing method of a printing device. The printing device comprises a connecting device which logically connects the printing device and an imaging device. The method decides an amount of data of an image suitable for communication by using at least one of information on the number of images printed per printing and information on an expected size of a printed image; and acquires the image having the amount of data which corresponds with the decided amount of data from the imaging device.

The present invention provides another image-transmitting method of an imaging device. The imaging device comprises a connecting device which logically connects the imaging device and a printing device. The method decides an amount of data of an image suitable for communication by using at least one of information on the number of images printed per printing and information on an expected size of a printed image; and transmits the image having the amount of data which corresponds with the decided amount of data.

The present invention provides yet another printing method for making a printing system perform printing. The printing system comprises an imaging device, a printing device, and a connecting device which logically connects the imaging device and the printing device. The method transmits and receives a part of an original image of an image file targeted to be printed.

The present invention provides yet another printing method of a printing device. The printing device comprises a connecting device which logically connects the printing device and an imaging device. The method prints an image by receiving a part of an original image of an image file targeted to be printed.

The present invention provides yet another image-transmitting method of an imaging device. The imaging device comprises a connecting device which logically connects the imaging device and a printing device. The method transmits a part of an original image of an image file targeted to be printed.

According to an embodiment of the present invention, the printing method of the printing system divides the original image at a neighborhood of a diverging point of a hierarchy structure of the original image, and transmits and receives the original image.

According to an embodiment of the present invention, the printing method of the printing device utilizes a diverging point of a hierarchy structure of the original image for printing.

According to an embodiment of the present invention, the image-transmitting method of the imaging device divides the original image by utilizing a reading section configured to read a diverging point of a hierarchy structure of the original image and information on the read diverging point, and transmits the original image.

The present invention also provides a printing method of a printing device. The printing device comprises a connecting device which logically connects the printing device and an imaging device. The method notifies the imaging device of a recommended data amount of a file to be transmitted or a recommended range of a data amount of the file to be transmitted.

The present invention also provides an image-transmitting method of an imaging device. The imaging device comprises a connecting device which logically connects the imaging device and a printing device. The method receives a recommended data amount of a file to be transmitted or a recommended range of a data amount of the file to be transmitted from the printing device.

According to an embodiment of the present invention, the image-transmitting method comprises a transmitting section configured to transmit an image which fits within the recommended data amount or the recommended range of the data amount.

According to an embodiment of the present invention, the printing method of the printing device comprises a deciding section configured to decide the recommended data amount or the recommended range of the data amount by utilizing at least one of an expected size of a printed image and performance of the printing device.

Accordingly, the printing system, the printing device, the imaging device, the printing method and the image-transmitting method of the present invention at least have the following advantages:

1. A time required for transmitting the images is reduced.
2. A time required for starting the printing is reduced and image quality will not be degraded.
3. A prominent effect to the speed of transmission can be obtained as the number of images printed per printing is increased.
4. A prominent effect to the image quality can be obtained as the number of images printed per printing is decreased.

It is to be understood that both the foregoing general description and the following detailed description are exemplary, and are intended to provide further explanation of the invention as claimed.

The disclosure of Japanese Patent Application No. 2004-195657, filed on Jul. 1, 2004, including specification, drawings and claims is incorporated herein by reference in its entirety.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts. The scope of the present invention, however, is not limited to these embodiments. Within the scope of the present invention, any structure and material described below can be appropriately modified.

Figure 1:
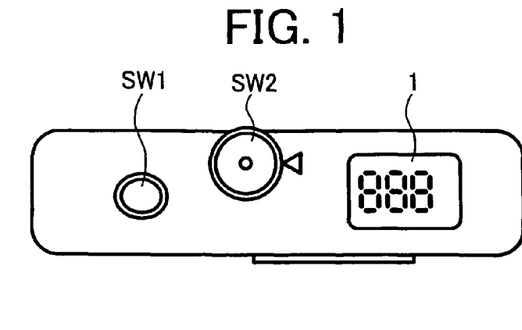
FIG. 1 is a schematic top view illustrating an external appearance of a digital camera as one example of an imaging device according to the present invention.
Figure 2:
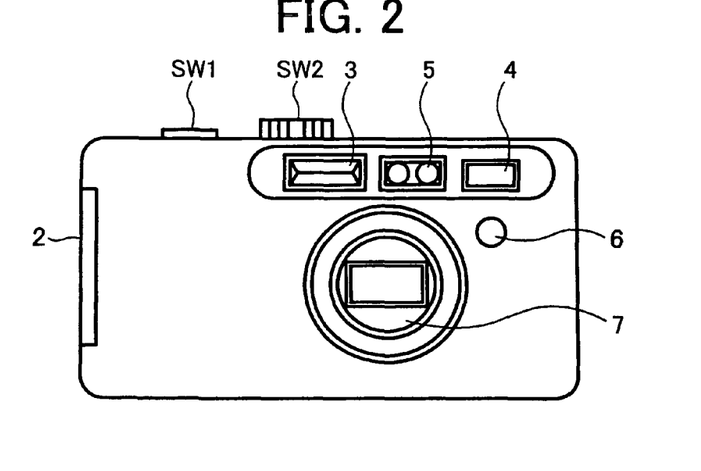
FIG. 2 is a schematic front view illustrating the external appearance of the digital camera of FIG. 1.
Figure 3:
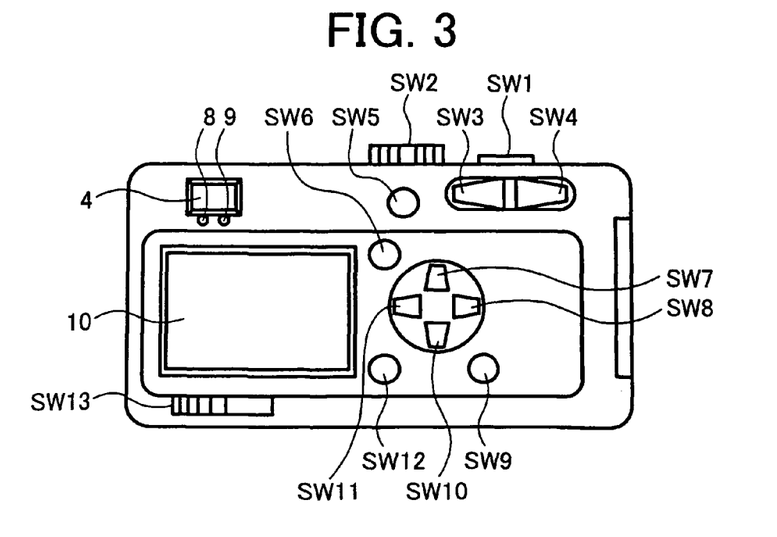
FIG. 3 is a schematic back view illustrating the external appearance of the digital camera of FIG. 1.
Figure 4:
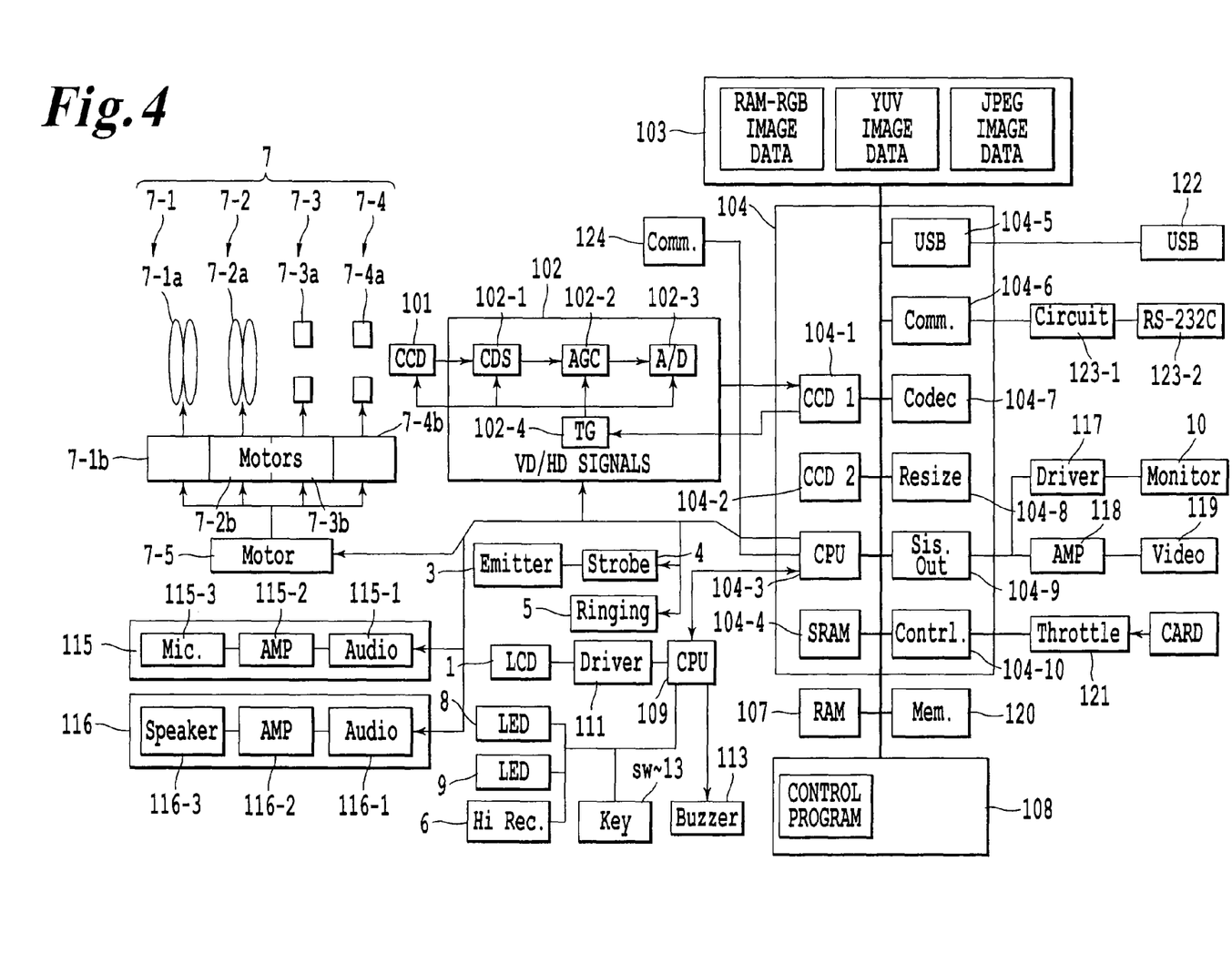
FIG. 4 is a block diagram of the digital camera as one example of the imaging device according to the present invention.

FIG. 1 is a schematic top view illustrating an external appearance of a digital camera as one example of an imaging device (imaging device) according to the present invention. FIG. 2 is a schematic front view illustrating the external appearance of the digital camera of FIG. 1. FIG. 3 is a schematic back view illustrating the external appearance of the digital camera of FIG. 1. FIG. 4 is a block diagram of the digital camera as one example of the imaging device according to the present invention.

First, a structure of the digital camera as one example of the imaging device according to the present invention will be explained with reference to FIGS. 1 to 4. A lens barrel unit 7 shown in FIGS. 1 to 4 includes a zoom optical system 7-1 comprising a zoom lens 7-1a and a zoom driving motor 7-1b for introducing an optical image of a photographed object.

The lens barrel unit 7 also has a focus optical system 7-2, an aperture unit 7-3, a mechanical shutter unit 7-4, and a motor driver 7-5. Wherein, the focus optical system 7-2 comprises a focus lens 7-2a and a focus driving motor 7-2b. The aperture unit 7-3 comprises an aperture 7-3a and an aperture motor 7-3b. The mechanical shutter unit 7-4 comprises a mechanical shutter 7-4a and a mechanical shutter motor 7-4b. The motor driver 7-5 drives each of the motors 7-1b, 7-2b, 7-3b and 7-4b.

The motor driver 7-5 is driven and controlled according to a driving command outputted from a CPU block 104-3 included in a digital still camera processor 104 which will be described later, based on an input, for example, from a remote control light receiver 6 and an operating key unit (SW1-SW13).

Control programs and parameters for performing control and so on, which are described in a code decodable by the CPU block 104-3, are stored in a ROM 108. The control program is loaded into a main memory which is not shown when power of the digital camera is turned to "ON" state.

The CPU block 104-3 controls operation of various portions of the device according to the control program, and also stores data or the like necessary for the control temporarily into a RAM 107 and a local SRAM 104-4 included in the digital still camera processor 104 which will be described later.

The CPU block 104-3 is also connected with a strobe-light emitting portion 3, a strobe circuit 4, and a ranging unit 5. The strobe-light emitting portion 3 emits strobe-light, which is controlled by the strobe circuit 4. The ranging unit 5 carries out ranging from the digital camera to the object to be photographed.

The ordinary skilled artisan in the field will readily notice that the control program and the control parameters can be changed by using a rewritable flash ROM or the like for the ROM 108, to easily upgrade a version (VerUp) of a function.

A CCD (Charge-Coupled Device) 101 is a solid-state image pick-up device for photo-electrically converting the optical image of the photographed object. An F/E (Front/End)-IC 102 comprises a CDS (Correlated Double Sampling) portion 102-1, an AGC (Automatic Gain Control) portion 102-2, and an A/D (Analog/Digital) portion 102-3. Wherein, the CDS portion 102-1 performs correlated double sampling for image noise removal, the AGC portion 102-2 carries out gain control, and the A/D portion 102-3 carries out digital signal conversion.

The F/E-IC 102 is supplied with vertical synchronizing signals (hereinafter referred to as VD) and horizontal synchronizing signals (hereinafter referred to as HD) from a CCD1 signal processing block 104-1. The F/E-IC 102 also has the CCD 101 controlled by the CPU block 104-3, and a TG (Timing Generator) 102-4 for generating drive-timing signals of the F/E-IC 102.

The digital still camera processor 104 performs white balance setting, gamma setting and so on to output data obtained from the CCD 101 and outputted from the F/E-IC 102. In addition, the digital still camera processor 104 comprises the CCD1 signal processing block 104-1 for supplying the VD signals and the HD signals as mentioned above, and a CCD2 signal processing block 104-2. The CCD2 signal processing block 104-2 converts the output data into brilliance data and chrominance difference data.

The digital still camera processor 104 further comprises the above-mentioned CPU block 104-3 for controlling respective portions of the device, the local SRAM 104-4 for temporarily storing the data or the like necessary for the control as mentioned above, an USB block 104-5 (connecting device), and a serial communication block 104-6. The USB block 104-5 carries out USB (Universal Serial Bus) communication with an external device such as a personal computer and a printing device which is described later. The serial communication block 104-6 is for carrying out serial communication with the external device such as the personal computer and the printing device.

Also, the digital still camera processor 104 has a JPEG CODEC (COder/DECoder) block 104-7, a resize block 104-8, a TV signal display block 104-9, and a memory card controller block 104-10. The JPEG CODEC block 104-7 carries out JPEG compression and decompression. The resize block 104-8 enlarges and reduces a size of photographed image data, for example, by an interpolation process. The TV signal display block 104-9 converts the image data into video signals to display the image data on an external display device such as a liquid crystal monitor and TV. The memory card controller block 104-10 controls a memory card which records the image data or the like.

A SDRAM (Synchronous Dynamic Random Access Memory) 103 temporarily stored the image data at the time when various processes are applied to the image data in the aforementioned digital still camera processor 104. The image data to be stored therein is loaded from the CCD 101 via the F/E-IC 102 for example.

The image data is stored in the SDRAM 103 as "RAW-RGB image data" in a state that the white balance setting and the gamma setting are performed thereto in the CCD1 signal processing block 104-1, as "YUV image data" in a state that the brilliance data and chrominance difference data conversion are carried out in the CCD2 signal processing block 104-2, and as "JPEG image data" wherein the image data is JPEG-compressed in the JPEG CODEC block 104-7.

A card throttle 121 is a throttle for attaching a detachable memory card, PHS (Personal Handyphone System), and a data card such as Bluetooth and LAN (Local Area Network) and so on.

A built-in memory 120 is a memory for enabling the photographed image data to be stored even when the memory card or the like is not attached to the above-mentioned card throttle 121.

The LCD driver 117 is a drive circuit for driving a LCD (Liquid Crystal Display) monitor 10 which will be described later. The LCD driver 117 also has a function to convert the video signals outputted from the TV signal display block 104-9 into signals for displaying the image data onto the LCD monitor 10.

The LCD monitor 10 is a monitor for monitoring a state of the photographing object before photographing, confirming a photographed image, and displaying the image data recorded in the memory card or in the above-mentioned built-in memory 120, for example.

A video AMP 118 is an amplifier for converting the video signals outputted from the TV signal display block 104-9 into signals of 75 ohm impedance. A video jack 119 is a jack for connecting the device with the external display device such as TV. An USB connector 122 is a connector for carrying out an USB connection with the external device such as the personal computer and the printing device.

A serial driver circuit 123-1 is a circuit for converting signals outputted from the aforementioned serial communication block 104-6 into voltage so as to carry out the serial communication with the external device such as the personal computer and the printing device. An RS-232C connector 123-2 is a connector for performing a serial connection with the external device such as the personal computer and the printing device. An external communication block 124 is a unit for wirelessly connecting the device and the external device such as the printing device.

A SUB-CPU 109 is a CPU in which a ROM and a RAM are embedded as one-chip. The SUG-CPU 109 outputs signals outputted from the operating key unit (SW1-SW13) and the remote control light receiver 6 to the above-mentioned CPU block 104-3 as user's operating information. The SUB-CPU 109 also converts a state of the camera outputted from the aforementioned CPU block 104-3 into control signals for a sub-LCD 1, an AF (Auto Focus) LED 8, a strobe LED 9 and a buzzer 113 which are described later, and output the control signals thereto.

The sub-LCD 1 is, for example, a display portion for displaying the number of times that the photographing is possible. A LCD driver 111 is a drive circuit for driving the sub-LCD 1 according to signals outputted from the SUB-CPU 109 mentioned above.

The AF LED 8 is LEDs for displaying a focusing state at the time of photographing. The strobe LED 9 is LEDs for representing a charging state of a strobe light. In one embodiment of the present invention, the AF LED 8 and the strobe LED 9 may be used for other display application, such as displaying a state that the memory card is being accessed.

The operating key unit (SW1-SW13) is a key circuit for enabling the user to operate the device. The remote control light receiver 6 is a portion for receiving signals from a remote control transmitter operated by the user.

An audio recording unit 115 comprises a microphone 115-3, a microphone AMP 115-2, and an audio recording circuit 115-1. Wherein, the microphone 115-3 enables the user to input sound and voice, the microphone AMP 115-2 amplifies signals of the sound and voice inputted from the microphone 115-3, and the audio recording circuit 115-1 records the amplified sound and voice signals.

An audio reproducing unit 116 comprises an audio reproducing circuit 116-1, an audio AMP 116-2, and a speaker 116-3, wherein the audio reproducing circuit 116-1 converts the recorded sound and voice signals into signals capable of being outputted by the speaker 116-3, the audio AMP 116-2 amplifies the converted sound and voice signals and drives the speaker 116-3, and the speaker 116-3 outputs the sound and voice signals.

Figure 5:
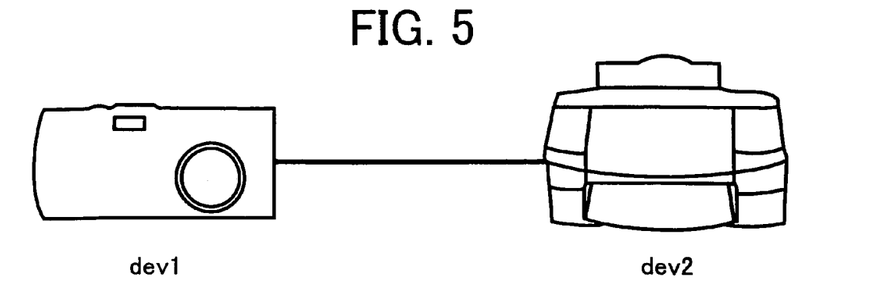
FIG. 5 is a diagram schematically showing a case of wired connection in which a camera and a printer are connected to each other via a wire.

FIG. 5 is a diagram schematically showing a case of wired connection in which a camera and a printer as a printing device are connected to each other via a wire. Referring to FIG. 5, the camera (dev1) and the printer (dev2) are connected to each other with a wired connection. Of course, in one embodiment, the camera (dev1) and the printer (dev2) can be connected to each other with a wireless connection such as PHS, data card including Bluetooth and LAN, or the internet.

Figure 10:
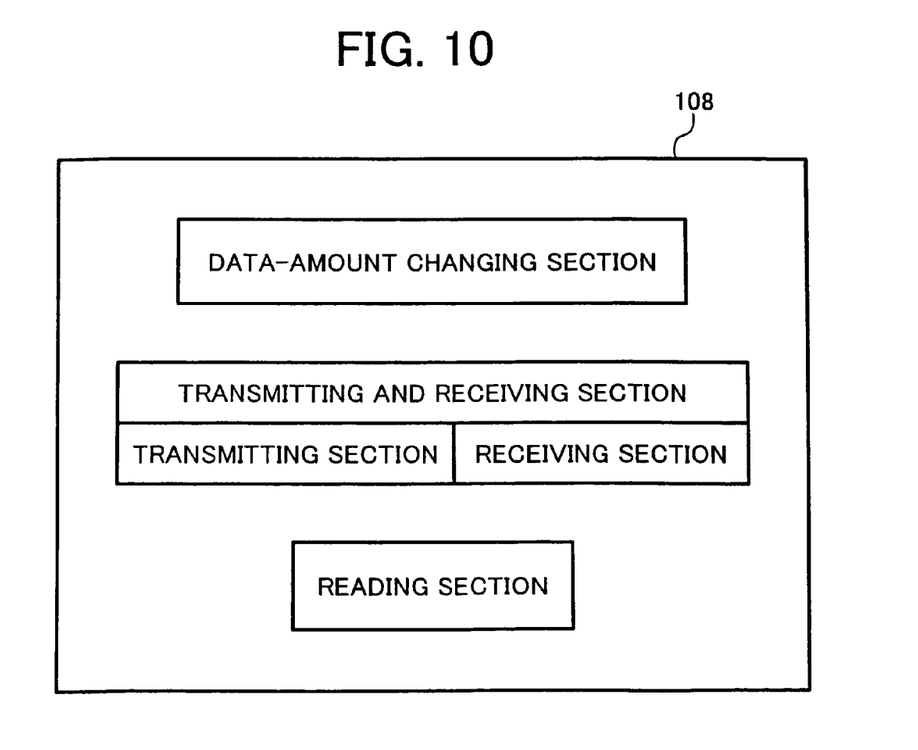
FIG. 10 is a schematic block diagram of a ROM.

The camera (dev1) may comprise a data-amount changing section, a transmitting section, a transmitting and receiving section, a reading section, and a receiving section. These data-amount changing section, the transmitting section, the transmitting and receiving section, the reading section, and the receiving section are included in the ROM 108 as programs stored therein as shown in FIG. 10. The data-amount changing section, the transmitting section, the transmitting and receiving section, the reading section, and the receiving section execute their functions, according to the control program stored in the ROM 108, following instructions from the CPU block 104-3.

Figure 11:
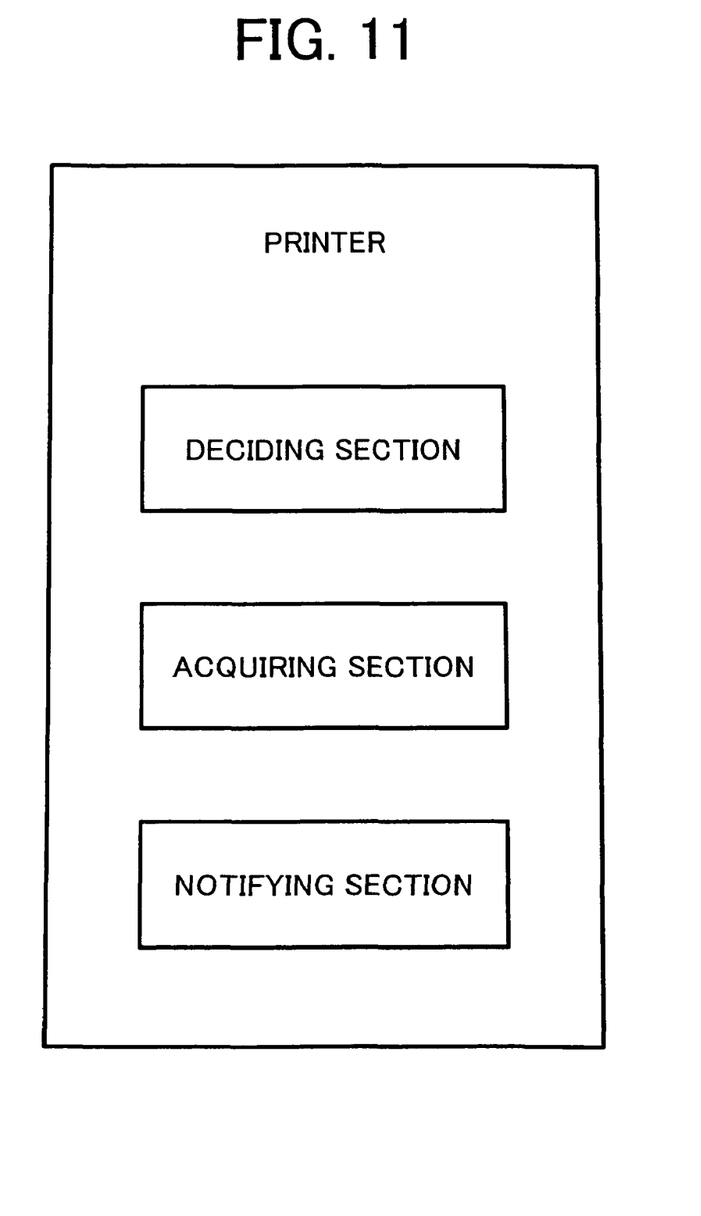
FIG. 11 is a schematic block diagram of the printer.

The printer (dev2) may comprise a deciding section, an acquiring section, and a notifying section as shown in FIG. 11.

When the user connects the camera (dev1) and the printer (dev2) with, for example but not limited to, an USB cable, these two devices automatically establish a connected state through initialization, negotiation and capability exchange.

Subsequently, the printer (dev2) acquires the version of USB actually used between the devices, and speculates a transfer rate from information on the version. The user inputs an instruction to the camera (dev1) to the effect that the user prints an index through an interface of the camera (dev1). The interface can be, for example but not limited to, the operating key unit (SW1-SW13) or the remote control light receiver 6 which receives the signals from the remote control transmitter operated by the user. The camera (dev1) accordingly transmits information regarding creation of the index to the printer (dev2).

Then, the printer (dev2) specifies to the camera (dev1) targeted images to be transmitted by using their frame numbers. The printer (dev2) decides a maximum amount of data per image by using two kinds of information of the transfer rate and the number of images to be printed on a single printing, so as to complete transfer of the images in the single printing within a predetermined time.

For example, in order that the printing of the index in which 40 images are printed may be initiated within 3 seconds with USB 2.0 (here, it is defined that 100 Mbps is the speculated transfer rate, corresponding to the USB 2.0), the amount of data per image of 100 Mbps×3÷40=7.5 M bits (approximately 950 KB) is calculated as the maximum amount of data.

Next, the printer (dev2) acquires addresses of the images targeted to be printed, and according to a top address of an original image, acquires the image such that a volume of communication, in other words, the data of this image, may fall within the maximum amount of data. The camera (dev1) adjusts a data amount by dividing (cutting) data at a boundary (diverging point) of a hierarchy structure of the image within the maximum amount of data. Such an image acquisition process is carried out for the number of images required (for 40 images in the above-mentioned example) to execute the index-type printing.

Figure 6:
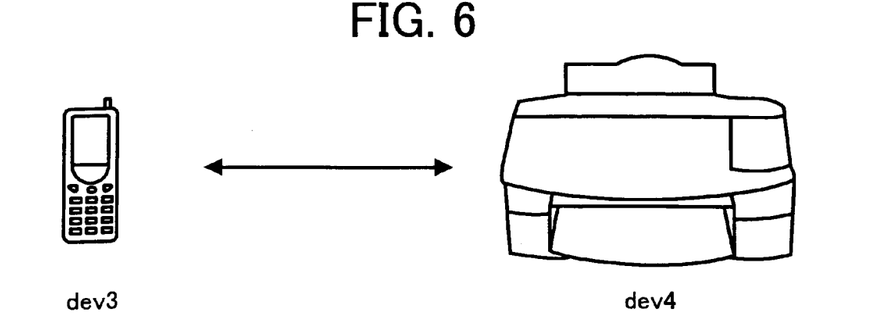
FIG. 6 is a diagram schematically showing a form of connecting a camera-equipped cellular phone and a printer with Bluetooth.

FIG. 6 is a diagram schematically showing a form of connecting a camera-equipped cellular phone (hereinafter referred to as a camera phone) and a printer with Bluetooth. Referring to FIG. 6, the camera phone (dev3) and the printer (dev4) are connected with the Bluetooth.

Figure 7:
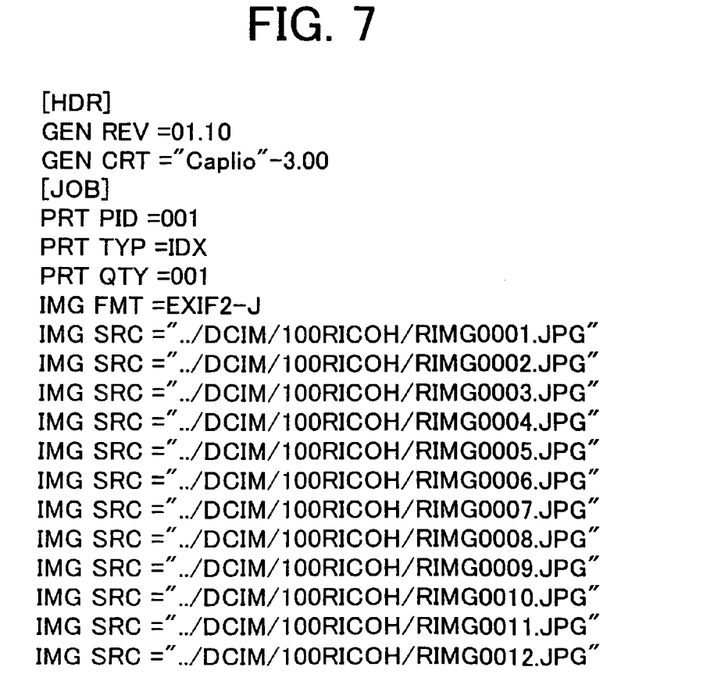
FIG. 7 is a diagram showing printing information.
Figure 8:
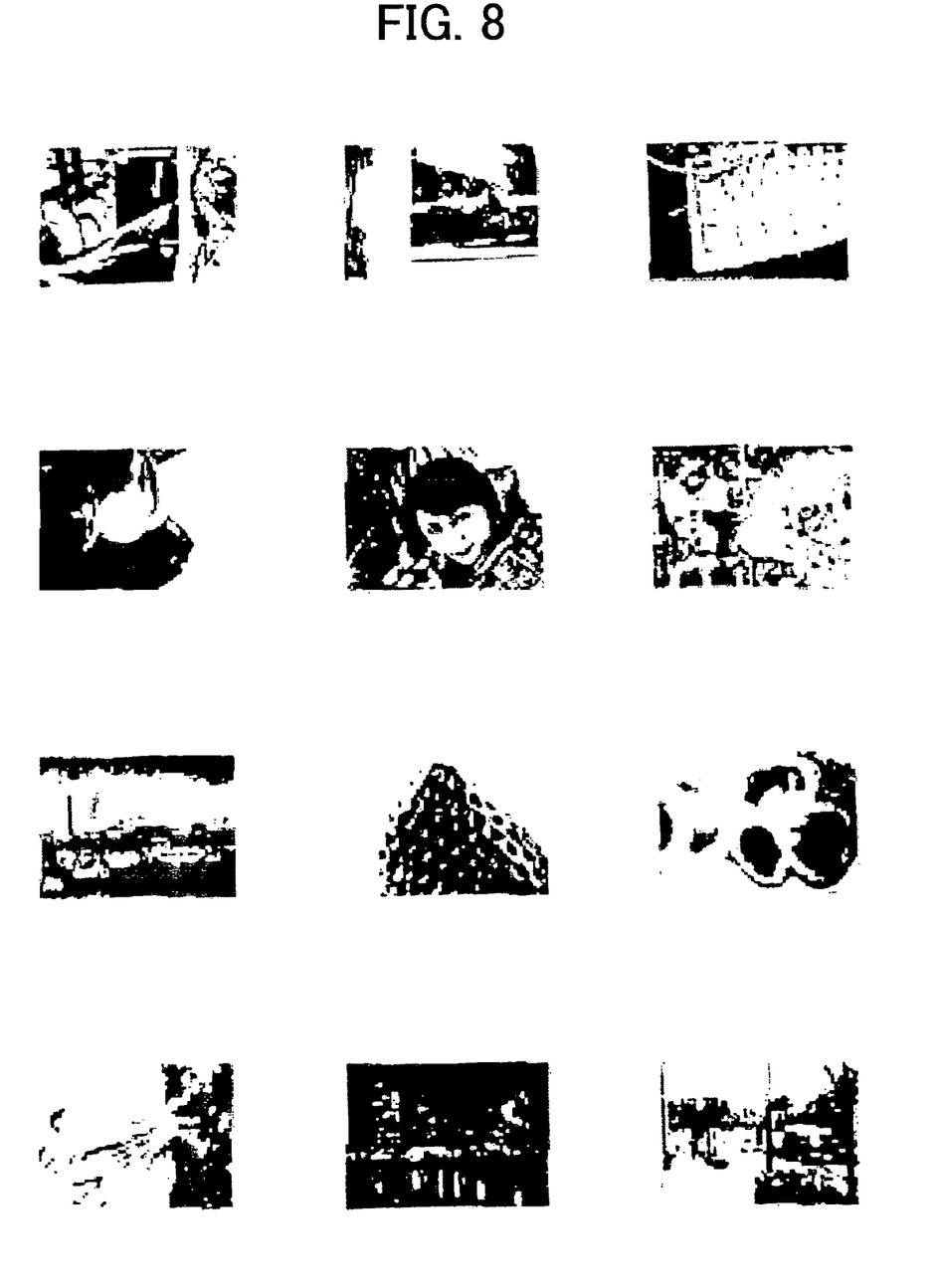
FIG. 8 is a schematic diagram for explaining index-type printing.
Figure 12:
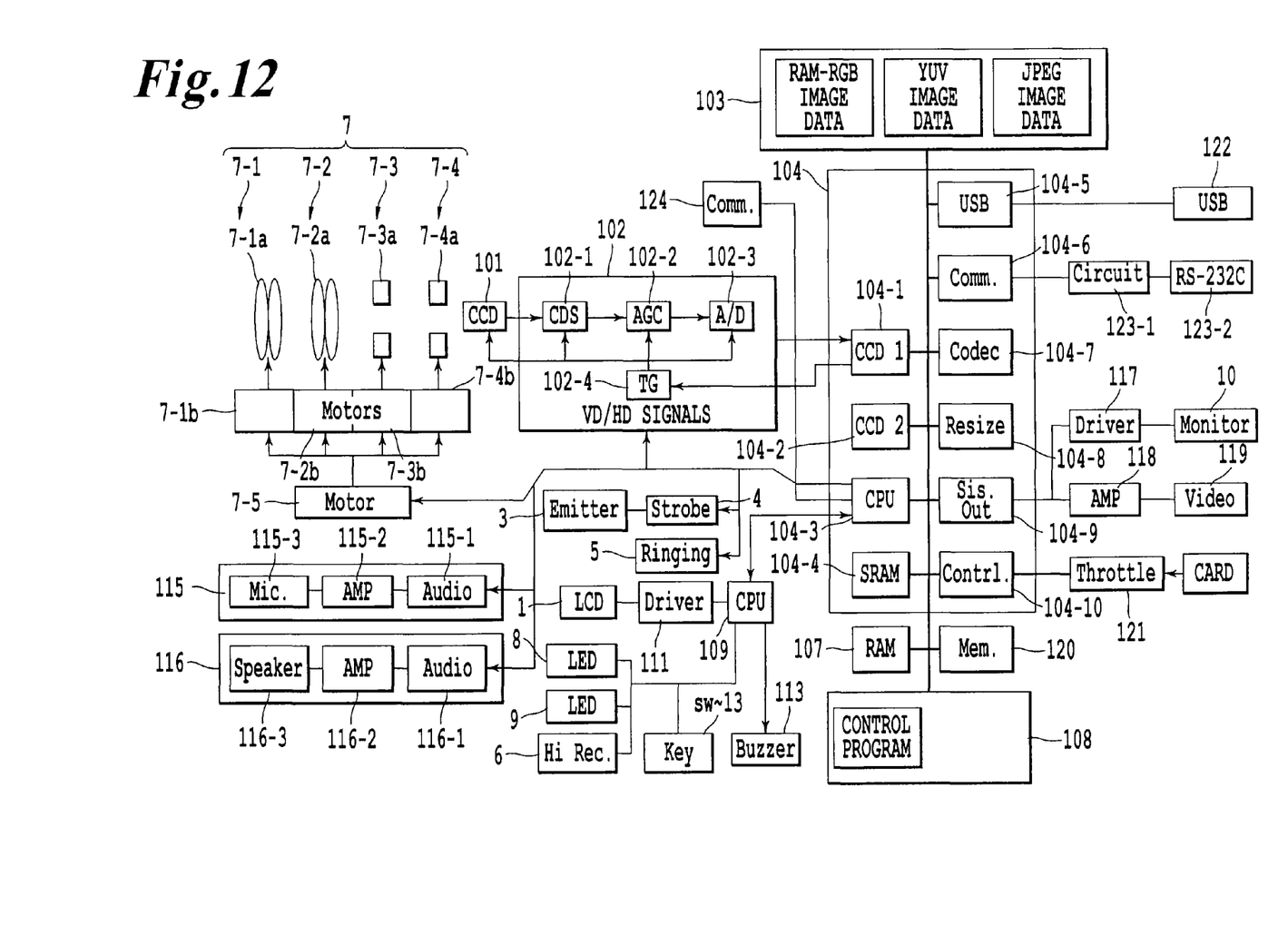
FIG. 12 is a block diagram showing a camera portion of the camera-equipped cellular phone as one example of the imaging device according to the present invention.

FIG. 7 is a diagram showing printing information. FIG. 8 is a schematic diagram for explaining the index-type printing. FIG. 12 is a block diagram showing a camera portion of the camera-equipped cellular phone as one example of the imaging device according to the present invention.

The camera phone (dev3) may comprise a data-amount changing section, a transmitting section, a transmitting and receiving section, a reading section, and a receiving section. These data-amount changing section, the transmitting section, the transmitting and receiving section, the reading section, and the receiving section are included in the ROM 108 as the programs stored in the ROM 108 as shown in FIG. 10. The data-amount changing section, the transmitting section, the transmitting and receiving section, the reading section, and the receiving section are executed and functions by the operation of the CPU block 104-3 according to the control program stored in the ROM 108.

The printer (dev4) may comprise a deciding section, an acquiring section, and a notifying section as shown in FIG. 11.

At first, the user operates the camera phone to place the two devices of the camera phone (dev3) and the printer (dev4) to be in a connected state through the Bluetooth. Alternatively, according to another embodiment, the camera phone (dev3) and the printer (dev4) are connected through other data card such as LAN, or the internet, or a fixed-line, for example.

Subsequently, the user operates buttons provided on the camera phone (dev3) so that a plurality of images specified among the images stored in the camera phone (dev3) may be printed in a form of an index as shown in FIG. 8. The camera phone (dev3) creates a file as shown in FIG. 7 representing contents of the operation of the user, and transmits the created file to the printer (dev4). Simultaneously, a communication speed is measured by utilizing the transmission of the created file from the camera phone (dev3) to the printer (dev4).

For example, an instruction that the index printing is to be created, name of file and a path used for creating the index printing are described in the file shown in FIG. 7. The printer (dev4) analyzes such a file, and sets a minimum amount of data to the extent that the printed image cannot be seen rough according to an expected size or a longitudinal length of the printed image.

Also, the printer (dev4) calculates a maximum amount of data per image from the communication speed previously examined and the number of images printed per printing. Then, the printer (dev4) specifies to the camera phone (dev3) a range of data amount of the image, such that the data amount of the image is between the minimum amount of data and the maximum amount of data, and at the same time, requests the camera phone (dev3) to transmit the image.

The camera phone (dev3) creates another file in an embedded RAM so that the data amount of the image may fit within the specified range of data amount, and transmits the image to the printer (dev4). The camera phone (dev3) transmits the file in such a form that the printer (dev4) cannot detect the file transmitted from the camera phone (dev3) is said another file.

Figure 9:
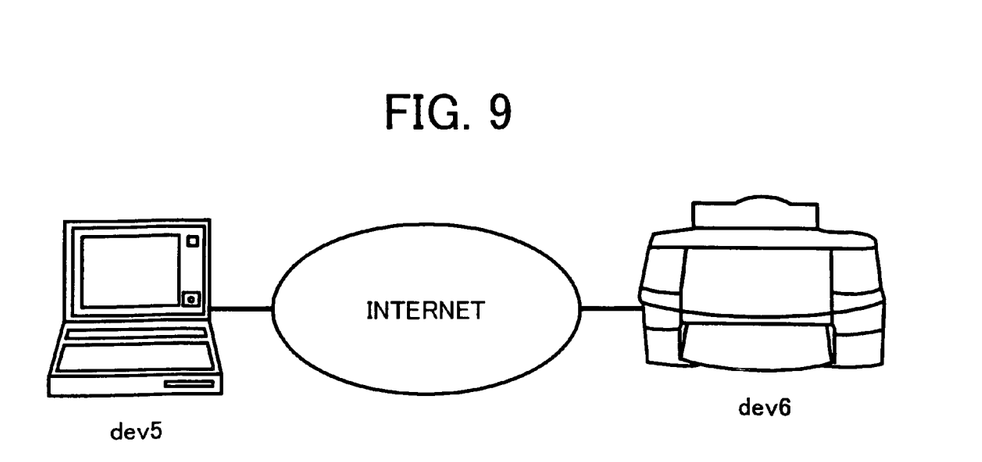
FIG. 9 is a diagram schematically showing a form of connecting a camera-equipped personal digital assistant (PDA) and a printer via the internet.
Figure 13:
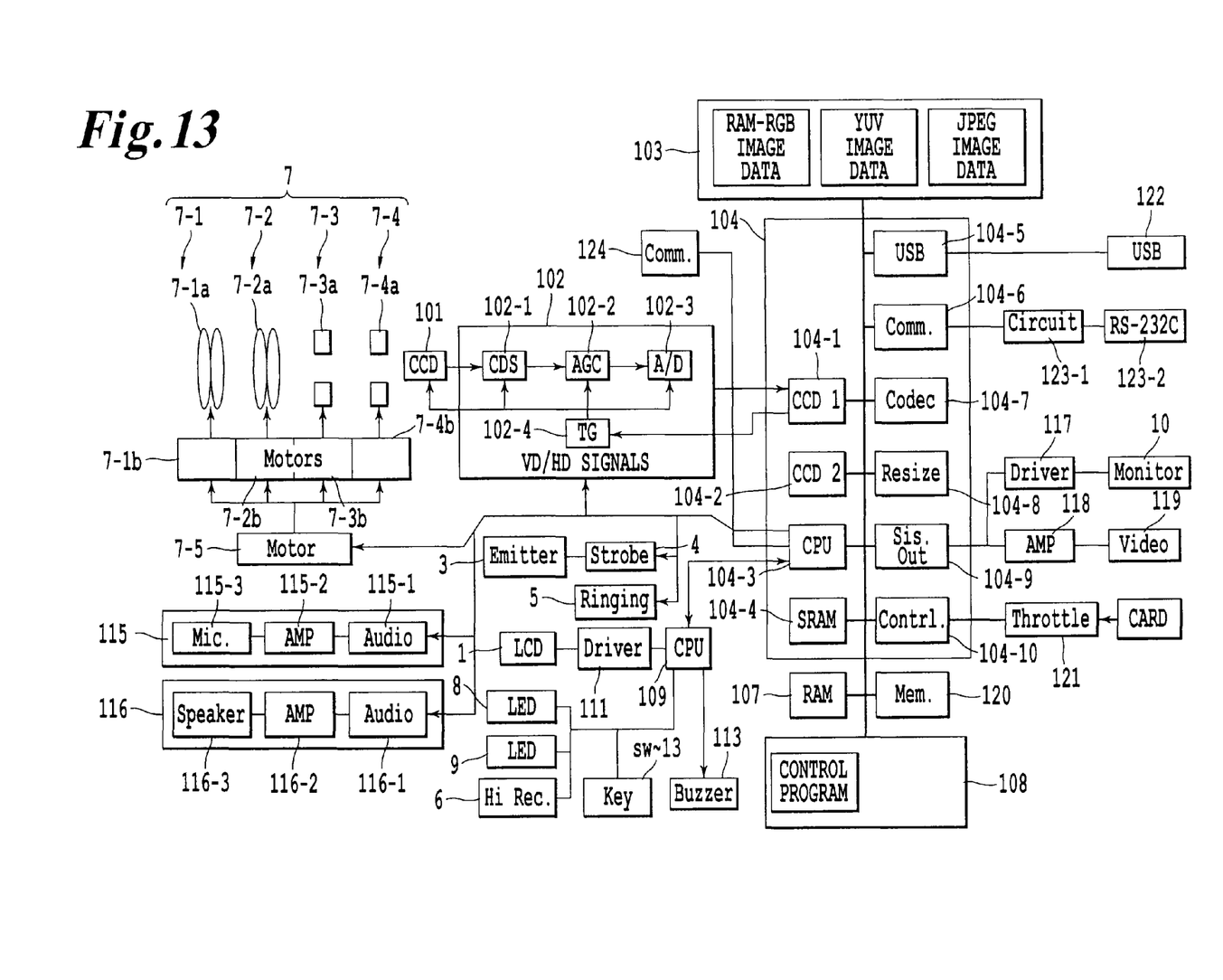
FIG. 13 is a block diagram showing a camera portion of the camera-equipped personal digital assistant as one example of the imaging device according to the present invention.

FIG. 9 is a diagram schematically showing a form of connecting a camera-equipped personal digital assistant (PDA) and a printer via the internet. FIG. 13 is a block diagram showing a camera portion of the camera-equipped personal digital assistant as one example of the imaging device according to the present invention.

Referring to FIG. 9, the camera-equipped PDA (dev5) and the printer (dev6) are connected through the internet.

A form of connection between the camera-equipped PDA (dev5) and a network such as the internet can be wireless or fixed-line. According to another embodiment, the camera-equipped PDA (dev5) and the printer (dev6) are connected through the fixed-line such as USB, or wireless connection such as PHS, the data card including the Bluetooth and LAN, for example.

The camera-equipped PDA (dev6) may comprise a data-amount changing section, a transmitting section, a transmitting and receiving section, a reading section, and a receiving section. These data-amount changing section, the transmitting section, the transmitting and receiving section, the reading section, and the receiving section are included in the ROM 108 as the programs stored in FIG. 10. The data-amount changing section, the transmitting section, the transmitting and receiving section, the reading section, and the receiving section are executed due to the operation of the CPU block 104-3 according to the control program stored in the ROM 108.

The printer (dev6) may comprise a deciding section, an acquiring section, and a notifying section as shown in FIG. 11.

The user sets a plurality of images he or she wishes to print and sets the number of images to be printed per printing in the camera-equipped PDA (dev5), and sets up the printer (dev6) for printing.

The camera-equipped PDA (dev5) notifies the printer (dev6) of the number of images printed per printing and that the printing is a multi-image type printing, through the internet.

The printer (dev6) then decides vertical and horizontal lengths of the image according to the notification from the camera-equipped PDA (dev5). The printer (dev6) uses two kinds of information of, information on the decided length of the image and information on performance of the printer (dev6), to decide a data amount of the image to the extent that quality of the image does not improve any more even when the data amount of the image is further increased. The printer (dev6), hence, defines the decided data amount of the image as a maximum amount of data of the image.

Thereafter, the printer (dev6) requests the camera-equipped PDA (dev5) to transmit the image, and at the same time, notifies the camera-equipped PDA (dev5) of the maximum amount of data. Accordingly, the camera-equipped PDA (dev5) executes resizing of the image and transmits the resized image to the printer (dev6).

Hereinafter, another embodiment of connecting the camera-equipped PDA (dev5) and the printer (dev6) through the internet as shown in FIG. 9 will be described. A form of connection between the camera-equipped PDA (dev5) and a network can be wireless or fixed-line. According to another embodiment, the camera-equipped PDA (dev5) and the printer (dev6) are connected through the fixed-line such as USB, or wireless connection such as PHS, the data card including the Bluetooth and LAN, for example.

The camera-equipped PDA (dev6) may comprise a data-amount changing section, a transmitting section, a transmitting and receiving section, a reading section, and a receiving section. These data-amount changing section, the transmitting section, the transmitting and receiving section, the reading section, and the receiving section are included in the ROM 108 as the programs stored in the ROM 108 as shown in FIG. 10. The data-amount changing section, the transmitting section, the transmitting and receiving section, the reading section, and the receiving section execute their functions following the instructions from the CPU block 104-3 according to the control program stored in the ROM 108.

The printer (dev6) may comprise a deciding section, an acquiring section, and a notifying section as shown in FIG. 11.

The user sets a plurality of images he or she wishes to print and sets the number of images to be printed per printing in the camera-equipped PDA (dev5), and sets up the printer (dev6) for printing.

The camera-equipped PDA (dev5) measures a communication speed, and decides a maximum amount of data per printing by utilizing information on the measured communication speed and the number of images printed per printing.

Then, the camera-equipped PDA (dev5) transmits information to the effect that the printing is a multi-image type printing and representing the number of images printed per printing to the printer (dev6), and subsequently, resizes the image such that a data amount of the image fits in the maximum amount of data. The camera-equipped PDA (dev5) transmits the resized image to the printer (dev6) one after the other.

Although the invention has been described in its preferred form with a certain degree of particularity, it is to be noted that the imaging devices or the imaging devices shown in the above-mentioned embodiments are not limited to the camera, the camera phone, and the camera-equipped PDA. It is also to be noted that the printing device or the printing device is not limited to the printer. Other device can be employed as long as such a device at least has an imaging function or a printing function. Therefore, the present invention can be applied to other electronic devices and a printing system utilizing those devices.

Also, in one embodiment, a communication standard is associated with the communication speed beforehand when deciding the communication speed. In another embodiment, a result of the measurement of the communication speed is used to decide the communication speed. A skilled artisan in the field can understand that a file format of the image targeted in the transmission and receiving does not necessarily have to have the hierarchy structure.

It is to be noted that a reduced image to be transmitted may be created in a nonvolatile memory concurrently with creation of the original image at the time when the photographing is carried out, and connecting device used in the present invention are not limited to the internet, PHS, LAN and Bluetooth, and the fixed-line utilizing the USB.

Although the present invention has been described in terms of exemplary embodiments, it is not limited thereto. Rather, the appended claims should be construed broadly to include other variants and embodiments of the invention which may be made by those skilled in the field of this art without departing from the scope and range of equivalents of the invention.

What is claimed is:

1. A printing system, comprising:
   an imaging device;
   a printing device;
   a connecting device logically connecting the imaging device and the printing device to transmit images from the imaging device to the printing device;

a deciding section included in the printing device and configured to decide an amount of data of an image transmitted from the imaging device to the printing device by use of a communication speed and a number of images to be printed on a single printing so as to complete transfer of the images in the single printing within three seconds; and a data-amount changing section configured to change the amount of data of the image to be transmitted according to the decision of the deciding section.

2. The printing system according to claim 1, wherein the decided amount of data is a maximum amount of data, and the deciding section is configured to decide a minimum amount of data per image to be transmitted from an expected size or a longitudinal length of a printed image.

3. The printing system according to claim 2, wherein the data-amount changing section is configured to change the amount of data of the image to be transmitted to have a range between the minimum amount of data and the maximum amount of data.

4. The printing system of claim 1, wherein the imaging device is a camera.

5. A printing method, comprising:

logically connecting an imaging device and a printing device to transmit images from the imaging device to the printing device;

deciding, with a processor, an amount of data per an image transmitted from the imaging device to the printing device by use of a communication speed and a number of images to be printed on a single printing so as to complete transfer of the images in the single printing within three seconds; and changing, with the processor, the amount of data of the image to be transmitted according to the decision.

6. The printing method according to claim 5, wherein the deciding includes setting the decided amount of data to be a maximum amount of data, and the deciding includes deciding a minimum amount of data per image to be transmitted from an expected size or a longitudinal length of a printed image.

7. The printing method according to claim 6, wherein the changing includes changing the amount of data of the image to be transmitted to have a range between the minimum amount of data and the maximum amount of data.

* * * * *